3,703,505
PREPARATION OF SULFURIZED OLEFINS
Andrew G. Horodysky and William Jaggers, Beaumont,
Tex., assignors to Mobil Oil Corporation
No Drawing. Filed Aug. 31, 1970, Ser. No. 68,467
Int. Cl. C07c 149/00
U.S. Cl. 260—139                    10 Claims

ABSTRACT OF THE DISCLOSURE

In preparing organic sulfides by reacting olefins (e.g., butylenes) with a sulfur halide to form a sulfohalogenated intermediate which is subsequently sulfurized and dehalogenated by reaction with an aqueous solution of an alkali metal sulfide compound to form a noncorrosive organic sulfide product of high sulfur content, blackening of both the intermediate and the final product is prevented by incorporating a small amount of a base (e.g., formamide) either in the sulfohalogenation reaction mixture or shortly thereafter in the intermediate prior to the sulfurization-dehalogenation reaction.

BACKGROUND OF THE INVENTION

Field of the invention

This invention relates to the preparation of organic sulfide compounds of improved color from olefinic materials.

Prior art

Various proposals have been made for producing organic sulfides by treating olefins with sulfur chlorides and then reacting the resulting intermediate with compounds containing sulfur. For example, organic polysulfides may be prepared by the sulfochlorination of olefins containing 6 or more carbon atoms and further treatment with inorganic higher polysulfides according to Eby Pat. No. 2,708,199. In addition, Myers Pat. No. 3,471,404 discloses that sulfurization reactions of this nature may be carried out by reacting a sulfochlorinated isobutylene intermediate product with a mixture of an alkali metal sulfide and free sulfur in a molar ratio of at least 2:1 followed by a further prolonged treatment with aqueous sodium hydroxide, apparently for reducing high chlorine contents, in producing extreme pressure additives. Beretvas et al. Pat. No. 3,068,218 indicates that sulfochlorinated products of improved color may be obtained by sulfochlorinating polymers of propylene, etc. containing 8 or more carbon atoms in an aqueous reaction mixture and then sulfurizing the intermediate with a solution of sodium sulfide in water and isopropanol in producing products with sulfur contents of the order of 10 to 34% by weight. In Kimball Pat. No. 2,249,312, the sulfochlorinated adduct of amylene or higher olefins is treated with sodium sulfide and/or other alkaline compounds to produce stable products of relatively low sulfur content and generally high chlorine contents.

In general, prior art organic sulfide compounds have one or more of such undesirable characteristics as high cost, low sulfur content and corrosive attack on metals and alloys used in machinery. Products having a chlorine content above 2% and also those produced from sodium polysulfide reactants are usually rather corrosive. These disadvantages can be overcome and organic sulfide compounds having improved properties, especially as to high sulfur content and low corrosion characteristics, obtained by the economical process described in application Ser. No. 2,349, filed on Jan. 12, 1970 by A. G. Horodysky in which the aqueous alkali metal monosulfide reactant employed in the final reaction is derived from a spent effluent stream resulting from hydrocarbon purification operations and consequently of low commercial value. However, it has been found that a very dark or black product is occasionally obtained in that process with some olefinic hydrocarbon reactants, and the same undesirable product coloration is believed to occur quite frequently in the aforesaid prior art methods. While there is no evidence that the black color in any way reduces the effectiveness of the material as an additive for extreme pressure lubricants, such discoloration does seriously affect its marketability. Customers have a strong aversion to accepting a black product, particularly when the normal color of such material is yellow or orange or light red. The instant invention is based upon the discovery of a technique for inhibiting such discoloration of the product.

SUMMARY OF THE INVENTION

The present invention is concerned with a process of preparing organic sulfides by sulfohalogenating an olefin with a sulfur halide to from a sulfohalogenated organic intermediate and thereafter sulfurizing and dehalogenating said intermediate by subsequent reaction with an alkali metal sulfide, and the invention is characterized by the improvement which comprises adding a base preferably a water-soluble base, prior to any substantial darkening of said intermediate and prior to said subsequent reaction, said base being characterized by the absence of black coloration in mixtures consisting of said base and said sulfur halide at temperatures suitable for said sulfohalogenation reaction. In practice, the aforesaid base is incorporated in either the sulfohalogenation reaction mixture or in the intermediate product shortly thereafter.

Other aspects of the invention relate to preferred bases and proportions thereof as well as the reaction stage at which the base is added.

DESCRIPTION OF SPECIFIC EMBODIMENTS

The base treatment of this invention serves to inhibit the excessive darkening or blackening of reaction mixtures for the sulfohalogenation of organic compounds in general and also to stabilize the color of the resulting adducts during prolonged storage; accordingly, it may be used in conjunction with any processes that involve the sulfohalogenation of olefinic materials. Thus, it can be utilized in any of the aforementioned and other prior art processes in which olefins are sulfohalogenated and subsequently subjected to a sulfurization-dehalogenation reaction in the production of organic sulfides, for discoloration or blackening frequently occur in these processes even when moderate temperatures, good catalysts and relatively pure reactants are employed. The novel treatment is particularly suitable for use in the economical process described in the aforesaid application Ser. No. 2,349 of producing organic sulfides of high sulfur content and excellent characteristics as an extreme pressure additive by providing a consistently light-colored product which is readily saleable. Consequently, the base treatment is described hereinafter mainly in respect to that process.

A wide variety of olefinic substances may be charged to the initial or sulfochlorination reaction including olefins with terminal or internal double bonds and containing from about 2 to 8 or more carbon atoms per molecule in either straight, branched chain or cyclic compounds, and these may be exemplified by ethylene, propylene, 1-butene, cis and trans-2-butene, isobutylene, diisobutylene, triisobutylene, the pentenes, cyclopentene, the hexenes, cyclohexene, the octenes, 1-decene, etc. In general, $C_{3-6}$ olefins or mixtures thereof are preferred for preparing sulfurized products for use as extreme pressure additives as the combined sulfur content of the product decreases with increasing carbon content, and the miscibility of the product with oil is lower in the case of propylene and ethylene derivatives.

In some embodiments of the invention, isobutylene is particularly preferred as the predominant olefinic reactant but it may be employed, desirably in major proportion, in mixtures containing one or more other olefins; moreover, the charge may contain substantial proportions of saturated aliphatic hydrocarbons, as exemplified by methane, ethane, propane, butanes, pentanes, etc. Such alkanes are preferably present in minor proportion in most instances to avoid unnecessary dilution of the reaction, since they neither react nor remain in the products but are expelled in the off-gases or by subsequent distillation. However, mixed charges can substantially improve the economics of the present process since such streams are of lower value than a stream of relatively pure isobutylene.

Volatile olefins are often readily available in liquid form, and it is usually desirable to charge olefinic liquids which are vaporized by the heat of reaction, as such evaporation provides a substantial cooling effect that permits the flow of water for cooling the reactor to be reduced considerably for greater economy. Also there are indications that the use of a volatile liquid olefin reactant has the unexpected and desirable effect of lowering the viscosity of the final product.

The other reactant in the first stage is preferably sulfur monochloride ($S_2Cl_2$); but other similar compounds such as sulfur dichloride and $S_3Cl_2$ as well as the corresponding but more expensive sulfur bromides may be employed in an amount which will provide a quantity of sulfur corresponding to desirable reactant ratios for sulfur monochloride. The molar ratio of olefin to sulfur monohalide may range from about 1:1 up to 1.65:1 or more. In the case of butylenes and sulfur monochloride, the optimum ratio appears to be between about 1.55:1 and 1.60:1.

Although anhydrous reaction conditions are generally regarded as providing better results, a small amount of water ranging up to about 1% of the weight of the sulfur halide may be present in the initial reaction; however it is usually preferred to keep the water content below about 0.5% on that basis.

The sulfohalogenation reaction is exothermic, evolving 500–650 B.t.u./lb. in the case of isobutylene, and cooling is necessary to prevent the temperature from exceeding about 160° F. with resultant darkening of the product and some decrease in the yield. The preferred range of reaction temperatures is from about 120 to 135° F. and a temperature of about 125° F. appears to be the optimum. Typical reaction times for the initial stage of the process range from about 1 to 15 hours.

The reaction pressure is not critical here and may be illustrated by pressures ranging from about 0 to 100 pounds per square inch gage pressure (p.s.i.g.) depending upon the reaction temperature and the volatility of the olefinic material.

The initial reaction is preferably catalyzed with a lower aliphatic alcohol containing from 1 to 4 carbon atoms, as exemplified by methanol, ethanol, propanol and isopropanol. Of these, methanol and ethanol are usually preferred, especially the former, and amount so the alcohol ranging from about 0.2 to 10% of the weight of the sulfur chloride may be utilized, but quantities of the order of 0.5 to 3% are usually preferred. While the catalytic alcohol may be introduced into the reactor in the liquid state, it is often more desirable to introduce it as a vapor.

Hydrogen chloride is evolved in the reaction and this gas is vented from the reactor. It may be recovered as hydrochloric acid in a water absorption system.

Prior to the sulfurization-dechlorination reaction described hereinafter, a small amount of an organic or inorganic base is incorporated in the sulfohalogenation reaction mixture or the reaction product to prevent or at least minimize discoloration therein. In any event, the basic agent should be added before an undesirable dark color appears, because the treatment is not capable of restoring the original light color after the dark coloration has developed. In other words, no decolorizing of either a highly colored reaction mixture or product upon introducing the base has yet been observed. A wide variety of basic substances may be employed for the purpose for excellent results are obtainable with either strong or weak bases, inorganic or organic, provided only that the base is compatible with the selected sulfur halide. Suitable compatibility is evidenced by the absence of substantial darkening or blackening in a mixture consisting entirely of the base and the sulfur halide when heated to the sulfohalogenation temperatures disclosed herein for a substantial period, such as an hour or more, and only a few amines are known to fail in that test. In general, water soluble bases are the preferred treating agents. Among the many suitable bases are formamide, dimethyl-formamide, acetamide, calcium hydroxide, ammonium hydroxide, and also the hydroxides acetates, carbonates and bicarbonates of alkali metals, as exemplified by sodium, lithium and potassium. Both the amides and hydroxides are highly effective color inhibitors, and the amides are preferred, especially formamide, when glass or glass-lined equipment is used in view of the tendency of alkali metal hydroxides to attack glass.

Since the base is effective in extremely small amounts, it may be added in quantities as small as 0.1%, based on the weight of the sulfur halide charge, in order to at least substantially inhibit discoloration in the reaction mixture or product. On the other hand, 10% additions have been used successfully without producing deleterious results, and there does not appear to be any critical upper limit for the amount of base added; but excessive quantities are wasteful and may require additional washing of the final product to eliminate such large amounts of the base. In the case of formamide, it has been found that employing 0.5% or more either during or soon after the sulfohalogenation reaction consistently provides a bright yellow final organic sulfide product, whereas the products obtained with smaller amounts of formamide tend to be somewhat darker orange liquids. In general it is preferred to employ about 0.5 to 3% of the base and to add it with the reactants or during the course of sulfohalogenation reaction.

Neither the darkening of the reaction mixture or product nor the manner in which the addition of the base prevents such discoloration are fully understood. Employing excessively high temperatures in the reaction will blacken the sulfohalogenation mixture, but darkening from this cause can readily be avoided by using the moderate reaction temperatures mentioned earlier. However, there are obviously other causes, as blackening occurs occasionally even when the reaction temperature is relatively low. There is some reason to suspect that 1-butene and trans-2-butene tend to promote discloration or blackening in these reactions. On the other hand, olefin charges of high isobutylene content seem less prone toward darkening. In some cases, blackening has been observed in the reaction mixture and in other cases it has developed during the storage of a bright clear adduct, sometimes within about 2 hours and sometimes overnight. In the case of such unstable intermediate products, addition of the base to the stored product prior to substantial darkening of the material will stabilize the product and prevent such darkening, apparently for prolonged periods, based upon observations over an interval of 30 days. Blackening of the subsequent sulfurization-dehalogenation reaction and the final product do not occur unless the adduct reactant is already badly discolored. Also, light-colored final products display no tendency to darken during prolonged storage.

While the present discovery should not be regarded as restricted to any particular theory, it may be possible that the undesirable blackening of the adduct is produced by an acid-catalyzed reaction wherein the hydrogen chloride evolved in sulfochlorination serves as the catalyst, and also that treating the mixture with a base according to the present invention serves to neutralize the hydrogen chloride dissolved in the liquid reaction mixture and thereby inhibit such catalytic action. Even though a large amount of hydrogen chloride is produced in the reaction, very little of it remains in solution by reason of its low solubility in the reaction liquor as well as the fact that the olefins bubbling through the reaction mixture tend to sweep out the hydrogen chloride as a gas; hence a very small amount of the base could accomplish such neutralization. It is not believed that the base tends to dehalogenate the intermediate product because that is a much slower reaction than neutralization. Also, it may be theorized that chloride salts of the base form during the aforesaid neutralization and/are subsequently discarded in the brine or later washes of the sulfurization-dehalogenation reaction described hereinafter.

In an integrated refinery, aqueous caustic alkali solutions are widely employed in the liquid phase purification of a variety of hydrocarbon streams, and the spent aqueous liquors resulting from such operations may be classified as "inorganic caustics" and "organic caustics." The spent inorganic caustic solutions usually have a relatively low content of organic compounds and are generally obtained from treating liquid propane, butane, butylene, solvent naphthas and alkylation effluents for the removal of mercaptans, sulfuric acid and especially hydrogen sulfide. As for the spent organic caustic liquors issuing from the treatment of catalytic gasolines and heavier distilliates, these aqueous solutions contain somewhat smaller amounts of the sulfide impurities but large proportions (e.g., over 25% by weight) of organic material, chiefly in the form of aromatic derivatives, such as phenolic and thiophenolic compounds. Although potassium hydroxide is operative for such purification, sodium hydroxide solutions are invariably used for economy. After mixing all of the spent caustic solutions in a typical refinery, the approximate composition of the mixture may be exemplified as:

| | Weight percent |
|---|---|
| Soduim hydroxide | 6.1–6.3 |
| Sodium hydrosulfide | 4.9–5.4 |
| Sodium cresylates [1] | 14.6–20.4 |
| Sodium sulfate | 0.5–0.7 |
| Sodium chloride | 0.04–0.06 |
| Oil | 0.3–0.4 |
| Ferrous sulfide (5–10 p.p.m.). | |
| Water | Balance |

[1] Sodium salts of cresols, thiocresols, phenol, thiophenol and the xylenols.

The largest component of the solute in these mixed spent solutions is the sodium cresylate mixture which is readily marketable after being recovered in the form of crude cresylic acids. The recovery can be accomplished economically by treating the caustic solution with the by-product or waste hydrogen sulfide from a catalytic hydrodesulfurization unit. This treatment springs the cresylate salts as an organic phase by conversion into cresylic acids, and it also converts the sodium sulfide and sodium hydroxide in the aqueous phase into sodium hydrosulfide. Upon standing, the mixture forms two layers with the upper layer varying in color from amber to black and containing the cresylic acids and other organic compounds while the bottom layer of aqueous sodium hydrosulfide solution separates cleanly as a a milky white or colorless liquid which is drawn off for use in the present process. Thus, the hydrogen sulfide treatment not only separates valuable cresylic and thiocresylic compounds and disposes of unwanted hydrogen sulfide but also has the desirable effect of substantially increasing the sulfur content of the aqueous phase for use in the present process.

The hydrogen sulfide treatment is usually carried essentially to completion as indicated by a pH value of about 8.0–8.5, whereupon only a small content of organic compounds remain in the aqueous phase. However, in some instances, the the $H_2S$ addition may be terminated earlier, for example, when the alkali metal hydrosulfide content reaches at least about 75% by weight of the dissolved alkali metal compounds. In the latter procedure, slightly more of the cresylic compounds are retained in the aqueous solution and also in the organic sulfide final product of this invention, and such retention may be desirable in view of the known antioxidant properties of alkylated phenolic compounds.

The aqueous phase derived from such treatment has a typical analysis by weight of:

| | |
|---|---|
| Sodium hydrosulfide | 16–24 |
| Sodium monosulfide | 0–4 |
| Sodium carbonate | 1–3 |
| Raw cresylic acids | 0.1–1.0 |
| Sodium sulfate | 0.7 |
| Sodium chloride | 0.05 |
| Water | Balance |

In preparing the sulfurizing reactant of the present process, this solution is then treated with a stoichiometric amount of sodium hydroxide (i.e., one mole of NaOH per mole of NaHS or up to about a 5% excess thereof which usually raises the pH to 10–10.5 in converting the sodium hydrosulfide to sodium monosulfide.

While it is usually preferable to employ an alkali metal sulfide reactant derived from a mixture of both the organic and inorganic types of spent caustic alkali solutions, substantial benefits are obtainable with a reactant prepared from spent caustic effluent of the inorganic type only. The same manner of preparation in the latter case except that there is seldom, if ever, any phase separation after the hydrogen sulfide treatment.

A lower aliphatic alcohol is generally added as a mutual solvent for the sulfurization de-chlorination reaction. Methanol, ethanol, propanol, butanol and isobutanol as well as mixtures thereof may be employed for the purpose, and isopropanol is preferred. Although a quantity of alcohol amount to 10% of the weight of the sulfohalogenation adduct provides adequate solvent action in the reaction mixture, surprising effects are obtained with larger proportions of the alcohol in the reaction mixture in that more alcohol up to a quantity of about 50% of the weight of the adduct not only provides an unexpected increase in the reaction rate but also a striking improvement in sharply reducing the content of undesired chlorine in the final product while increasing its sulfur content. Thus it is desirable to charge at least about 20% alcohol and the range of about 25 to 40% is preferred. While larger proportions of alcohol may provide some additional benefit, the cost of handling and recovering the extra alcohol also increases.

In sulfurizing and dechlorinating the sulfochlorination additional product, the aqueous alkali metal monosulfide solution is desirably present in at least a stoichiometric quantity, and preferably a slight excess, of available alkali metal in order to remove essentially all of the combined chlorine from the adduct. In practice, the adduct or intermediate product from the sulfochlorination reaction is pumped into the solution of sodium monosulfide in water and the alcohol in an amount usually ranging from 2.52 to 2.70 pounds of adduct per pound of the sodium sulfide (anhydrous basis) in providing a slight excess of available sodium.

In general, this treatment of the adduct may be carried out at temperatures between about 150 and 250° F. and the range between about 170 and 195° F. is usually preferred. The reaction pressure may be subatmospheric or elevated up to 50 or more p.s.i.g. For simplicity, it is usually preferable to carry out the reaction at reflux temperature of typically 175 to 185° F. under atmospheric pressure in a vessel equipped with a reflux condenser.

This second reaction is continued with occasional sampling of the reaction mixture until the organic phase that separates upon standing is found to have a suitably low content of combined chlorine usually below 0.5% by weight and often less than 0.2%. Typically this may require from about 1 to 3 hours under preferred conditions depending upon a number of factors including the reaction temperature and the proportion of isopropanol or other alcohol present in the reaction mixture, but longer reaction times may be employed if desired.

When the chlorine has been reduced to the selected level, the reaction mixture is allowed to stand and separate into a lower aqueous sodium chloride layer and an upper liquid layer containing the desired organic sulfide product. After the brine layer has been drained off, the liquid organic product is usually transferred to a wash vessel wherein it is washed with an aqueous caustic alkali solution and one or more times with water, then allowed to stand until the organic and aqueous layers separate whereupon the wash water is withdrawn and discarded. The washing and separation of liquid phases may be expedited by the introduction of a substantial quantity of an organic solvent, such as hexane, benzene or petroleum ether. The caustic alkali wash treatment is not always necessary in the instant process for obtaining a product having a good copper corrosion strip rating and low chlorine content. The washed product is usually dried by heating at moderately elevated temperatures under subatmospheric pressure, and its clarity may often be improved by filtering the dried product through a bed of bauxite, clay or diatomaceous earth particles.

In addition to the advantages described earlier, other benefits are obtained by employing an alkali metal monosulfide reactant derived from spent aqueous caustic treating solutions of petroleum refinery origin, inasmuch as the organic sulfide product generally displays a higher combined sulfur content and is also less corrosive than the products obtainable by employing an aqueous solution of a commercial grade of either sodium monosulfide or sodium hydrosulfide in the sulfurizing dechlorinating reaction. The cause of this unusual effect as well as certain other aforementioned advantages of the process is not understood at the present time. Moreover, while the chemical composition of the final organic sulfide products of the instant process have not been fully ascertained, there is evidence that they contain a high proportion of —S—S— linkages, and such products do not corrode copper in contrast with products containing higher polysulfide linkages. In addition, the base treatment of the instant invention provides a product of good color even when the olefinic reactant is an inexpensive mixture of olefins, with or without some paraffins, instead of using a much more costly charge of relatively pure isobutylene.

For a better understanding of the nature, objects and advantages of this invention, reference should be had to the following examples wherein letters are employed to designate comparative examples and numerals are used for examples which illustrate the present invention but are not intended as limitations thereon. Unless otherwise stated, all proportions are set forth in terms of weight and all temperatures as degrees Fahrenheit.

EXAMPLES

The table of examples hereinafter sets forth the reaction conditions and results obtained in a series of runs wherein two olefinic mixtures were sulfochlorinated and, in most cases, the intermediate products were subjected to sulfurization-dechlorination after a period in storage of from 2 to 14 days, usually about 5 days. In Comparative Examples A and B, the hydrocarbon charge comprised 89% of isobutylene and 10% by volume of trans-2-butene. In the remaining examples, the hydrocarbon charge mixture had the following composition by volume:

| | |
|---|---|
| Propane | 0.3 |
| n-Butane | 35.9 |
| Isobutane | 1.2 |
| Propylene | 0.1 |
| 1-butene | 24.1 |
| Isobutylene | 31.0 |
| Trans-2-butene | 7.4 |
| Methyl acetylene (200 p.p.m.) | |
| | 100.0 |

First the full charge of sulfur monochloride was poured into a closed, glass lined vessel equipped with an agitator, a gas sparger, an external jacket for controlling the temperature by circulating heating or cooling fluids, and a vent line at the top for discharging gaseous material to a caustic soda scrubber. The olefinic charge was then introduced in vapor form along with a small amount of vaporized methanol through the submerged sparger until the absorption of olefins in the reaction mixture reached a total of typically about 1.6 moles per mole of sulfur monochloride therein. Continual stirring was maintained during this exothermic reaction which was catalyzed by the methanol, and the vessel was cooled with water to maintain the reaction temperature at the level set forth in the table. Hydrogen chloride evolved in this step was vented along with unreacted hydrocarbons, such as butane, to the scrubber. In contrast with the comparative examples, treatment with a base according to the present invention was employed in Examples 1 to 9, inclusive; and the base was added in one or more portions in the initial charge or during the progress of the sulfochlorination reaction or afterwards to the product of this reaction as mentioned hereinafter.

The sodium monosulfide solution employed as the sulfurizing-dechlorinating reactant for the subsequent reaction was prepared from a refinery hydrosulfide solution. The hydrosulfide solution was the aqueous phase separated from an overall refinery mixture of spent caustic soda solutions of the inorganic and organic types after treatment with hydrogen sulfide in the manner described hereinbefore to produce an aqueous solution of chiefly sodium hydrosulfide with some sodium monosulfide and the minor amounts of other components mentioned earlier. Caustic soda was added to the hydrosulfide solution to convert all of the hydrosulfide and provide a charge solution containing 27% of sodium monosulfide in water.

For the sulfurization-dechlorination reaction, the sodium sulfide solution and isopropanol were charged to a stirred vessel equipped with a jacket for temperature control and heated to approximately the specified reaction temperature with constant stirring; then the adduct produced in the first reaction was added slowly through a dip tube extending below the surface of the liquid over a period of ½ hour while cooling water was circulated through the jacket to restrain the observed temperature exotherm. At the end of the reaction time listed in the table, the isopropanol and a substantial amount of water were distilled off and agitation was suspended to allow the liquid mixture to separate into organic and aqueous brine layers. The brine layer was discarded and the organic phase containing the product was subjected to three washes, first with an equal volume of 5% aqueous sodium hydroxide followed by two washes, each with an equal volume of water. After drying the liquid product under a vacuum of 10 inches of mercury at 200° F., it was filtered through a bed of bauxite particles.

In the foregoing tabulated examples, several bases were added in the stated percentages (based on the proportionate weight of sulfur monochloride charged) at various stages before, during and immediately after (storage) the initial or adduct reaction as set forth in the following list wherein Examples 1 and 2 are listed twice to include samples of the intermediate product which were subjected to a dual treatment as well as samples that received only a single treatment with a base.

| Example: | Base treatment | Treating stage |
|---|---|---|
| 1A | 10% NaOH | Before. |
| 1B | 1A plus 5% dimethylformamide later | Before and after. |
| 2A | 10% sodium hydroxide | Before. |
| 2B | 2A plus 1% of NaOH later | Before and after. |
| 3 | 1.0% formamide | After. |
| 4 | 0.5% formamide | During. |
| 5 | do | Do. |
| 6 | 0.5% formamide in 4 portions | Do. |
| 7 | 0.5% formamide | Before. |
| 8 | 8.0% formamide | Do. |
| 9 | 0.5% formamide | During |

From the foregoing table of examples, it is evident from Comparative Examples A and B that the sulfohalogenation of olefins is likely to produce black adducts at both conventional and rather low reaction temperatures. In comparative Example C, a clear product of good color was initially obtained, perhaps due to the unusually low reaction temperature of 92° F., but this intermediate was unstable and darkened to a dark red color; and when the red adduct was later sulfurized, a black final product resulted. Two samples of the original bright yellow adduct of Example C were mixed with two different basic agents according to the present invention, and the fact that these retained their original bright color for a period of over 20 days is a convincing demonstration that the novel base treatment can stabilize an unstable adduct. The illustrative Examples 1–9, inclusive, all indicate that good intermediate and final products may be obtained according to the present invention at considerably higher adduct reaction temperatures and times than employed in Comparative Example C. Moreover, the final organic sulfide products have unusually high sulfur contents, low chlorine contents, and good ratings in the copper corrosion tests, and they display no tendency toward darkening during prolonged storage.

While the process of the present invention has been described in detail in conjunction with the treatment of a limited number of reactants under similar conditions for the purposes of valid comparisons and of fully illustrating this invention, it will be readily apparent to those skilled in the art that numerous reactants, and reaction conditions are within the purview of this invention. Accordingly, the present invention should not be construed as limited in any particulars except as may be set forth in the appended claims or required by the prior art.

We claim:

1. In the process of preparing organic sulfides by sulfohalogenating an olefin with a sulfur chloride in the respective ratios of 1:1 to 1:1.65 and at 120° to 165° C. to form a sulfochlorinated organic intermediate and thereafter sulfurizing and dechlorinating said intermediate at from 150° to 250° C. by subsequent reaction with at least a stoichiometric amount of an alkali metal sulfide, the improvement which comprises adding from about 0.1% to 10% by weight of the sulfur chloride of a base prior to any substantial darkening of said intermediate and prior to said subsequent reaction, whereby black coloration is prevented.

2. A process according to claim 1 in which the quantity of said base amounts to at least about 0.5% of the weight of said sulfur chloride.

3. A process according to claim 1 in which said base is a water-soluble base.

4. A process according to claim 1 in which said base is of the group consisting of amides.

5. A process according to claim 1 in which said base is of the group consisting of the hydroxides, carbonates, bicarbonates and acetates of alkali metals.

6. A process according to claim 1 in which said base is formamide.

7. A process according to claim 1 in which said base is dimethylformamide.

8. A process according to claim 1 in which said base is sodium hydroxide.

9. A process according to claim 1 in which formamide is present during said sulfochlorination reaction in an amount equal to at least about 0.5% of the weight of sulfur chloride.

10. A process according to claim 1 in which sodium hydroxide is present during said sulfochlorination reaction in an amount equal to at least about 0.5% of the weight of sulfur chloride.

References Cited

UNITED STATES PATENTS 3,471,404   10/1969   Myers _____ 260—139 X

LEWIS GOTTS, Primary Examiner

D. R. PHILLIPS, Assistant Examiner

PO-1050
(5/69)

UNITED STATES PATENT OFFICE
CERTIFICATE OF CORRECTION

Patent No. 3,703,505          Dated November 21, 1972

Inventor(s) Andrew G. Horodysky and William Jaggers

It is certified that error appears in the above-identified patent and that said Letters Patent are hereby corrected as shown below:

In column 5, line 38 "distilliates" should be -- distillates --.
In column 10, line 13, "5%" should be -- 1% --.

Signed and sealed this 10th day of July 1973.

(SEAL)
Attest:

EDWARD M. FLETCHER, JR.          Rene Tegtmeyer
Attesting Officer          Acting Commissioner of Patents